US010992526B1

(12) United States Patent
Ali et al.

(10) Patent No.: US 10,992,526 B1
(45) Date of Patent: Apr. 27, 2021

(54) HYPER-CONVERGED INFRASTRUCTURE NETWORKING CONFIGURATION SYSTEM

(71) Applicant: Dell Products L.P., Round Rock, TX (US)

(72) Inventors: Rizwan Ali, Cedar Park, TX (US); Ravikanth Chaganti, Karnataka (IN); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/653,606

(22) Filed: Oct. 15, 2019

(51) Int. Cl.
*G06F 15/177* (2006.01)
*H04L 12/24* (2006.01)
*H04L 29/08* (2006.01)
*G06F 9/455* (2018.01)

(52) U.S. Cl.
CPC ...... *H04L 41/0806* (2013.01); *G06F 9/45558* (2013.01); *H04L 67/1097* (2013.01); *G06F 2009/45595* (2013.01)

(58) Field of Classification Search
None
See application file for complete search history.

(56) References Cited

U.S. PATENT DOCUMENTS

| 7,380,025 | B1 | 5/2008 | Riggins et al. |
| 10,630,501 | B2 * | 4/2020 | Ansari ............ G08B 13/19656 |
| 2018/0367607 | A1 | 12/2018 | Gakhar et al. |
| 2019/0138360 | A1 * | 5/2019 | Devireddy ............ G06F 9/5044 |
| 2019/0227845 | A1 * | 7/2019 | Sridhar ................. G06F 9/5011 |
| 2019/0391831 | A1 * | 12/2019 | Yang ....................... H04L 67/10 |
| 2020/0004570 | A1 * | 1/2020 | Glade ................. G06F 9/45558 |
| 2020/0104153 | A1 * | 4/2020 | Shibayama ........... G06F 9/5027 |
| 2020/0204449 | A1 * | 6/2020 | Bitterfeld ................ H04L 41/12 |
| 2020/0280492 | A1 * | 9/2020 | Devireddy .............. H04L 41/20 |

* cited by examiner

*Primary Examiner* — Phyllis A Book
(74) *Attorney, Agent, or Firm* — Haynes and Boone, LLP

(57) ABSTRACT

A Hyper-Converged Infrastructure (HCI) networking configuration system includes HCI node subsystems with different configuration requirements, and a networking subsystem coupled HCI node subsystems via respective port(s). The networking subsystem identifies each of the HCI node subsystems and, based on that determine, based on those identifications, determines respective different configuration requirements for each of the HCI node subsystems. Based on those respective configuration requirements, the networking subsystem generates a networking subsystem configuration, and applies the networking subsystem configuration to the networking subsystem such that each of its respective ports coupled to the HCI node subsystems is configured to provide communication between the networking subsystem and that HCI node subsystem.

20 Claims, 11 Drawing Sheets

US 10,992,526 B1

HYPER-CONVERGED INFRASTRUCTURE NETWORKING CONFIGURATION SYSTEM

BACKGROUND

The present disclosure relates generally to information handling systems, and more particularly to configuring networking for a Hyper-Converged Infrastructure (HCI) information handing system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided as a Hyper-Converged Infrastructure (HCI) system, which is a software-defined Information Technology (IT) infrastructure that virtualizes elements of conventional "hardware-defined" systems, and may be provided by virtualized computing (e.g., via a hypervisor), a virtualized Storage Area Network (SAN) (e.g., software-defined storage), and in some situations virtualized networking (e.g., storage defined networking), any or all of which may be provided using commercial "off-the-shelf" server devices. HCI systems are rapidly replacing legacy infrastructure that uses separate physical server devices, storage devices, and networking devices, and are also being implemented in a variety of new use cases. However, the configuration of HCI systems can raise some issues. For example, one area of complexity in the configuration of HCI systems is associated with the networking functionality utilized by HCI system. As discussed above, HCI systems integrate computing, storage, and in some cases networking, and will often operate to handle many different types and classes of network traffic. Furthermore, such network traffic may be converged on a single network fabric, or may be non-converged on separate Local Area Networks (LAN) fabrics and storage fabrics. In order to provide high availability for the HCI system, the networking functionality utilized by the HCI system may be provided by multiple network adapters that are associated with particular networks and virtual LANs (VLANs) in order handle the converged and/or non-converged traffic discussed above. The flexibility provided by the different networking functionality options available in HCI systems is associated with a variety of different options for networking configuration, and in conventional HCI systems results in a manual and error-prone networking configuration process.

Accordingly, it would be desirable to provide an HCI networking configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Hyper-Converged Infrastructure (HCI) networking configuration engine that is configured to: identify each of a plurality of HCI node subsystems that are each coupled to at least one respective port that is connected to the processing system; determine, based at least in part on the identification of each of the plurality of HCI node subsystems, respective configuration requirements for each of the plurality of HCI node subsystems, wherein respective first configuration requirements for the at least one first HCI node subsystem are different than respective second configuration requirements for the at least one second HCI node subsystem; generate, based on the respective configuration requirements for each of the plurality of HCI node subsystems, an HCI networking subsystem configuration; and apply the HCI networking subsystem configuration such that each respective port that is coupled to the plurality of HCI node subsystems is configured to provide communication between the processing system and that HCI node subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
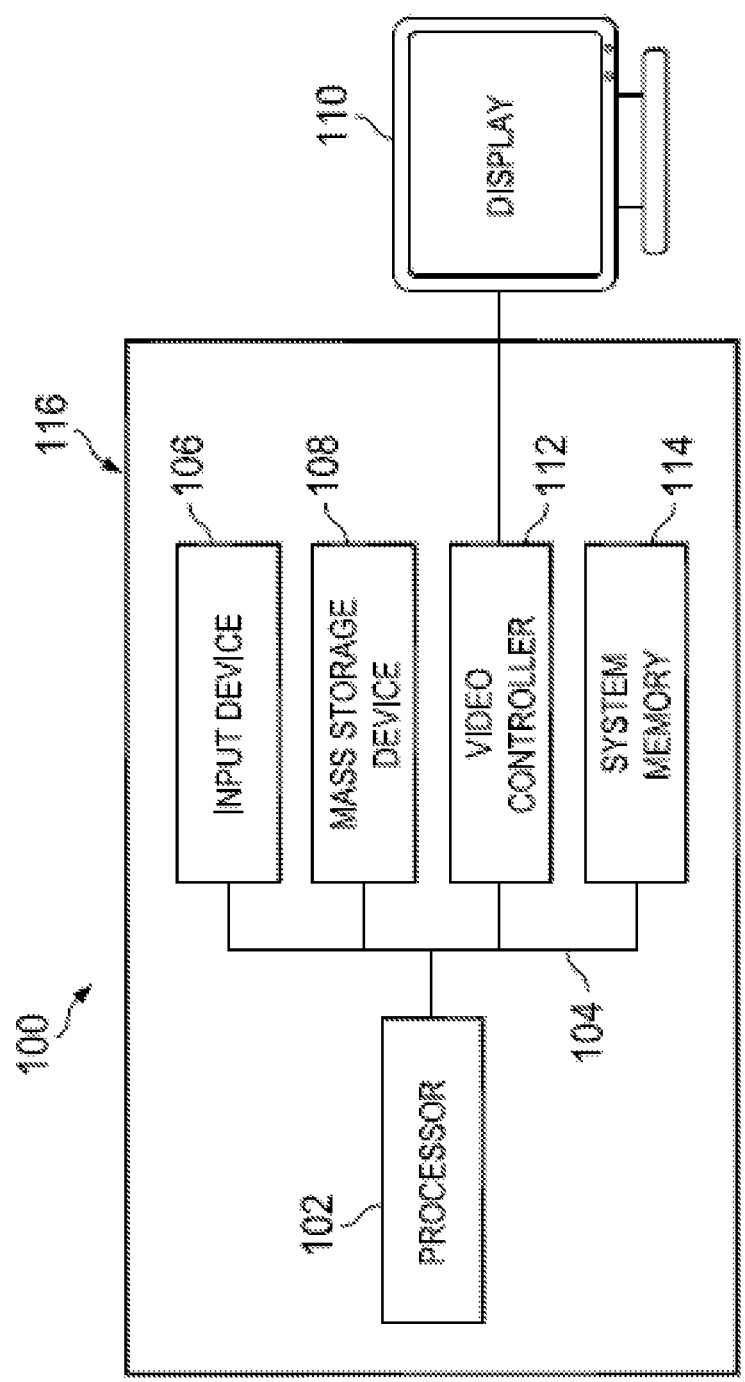
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
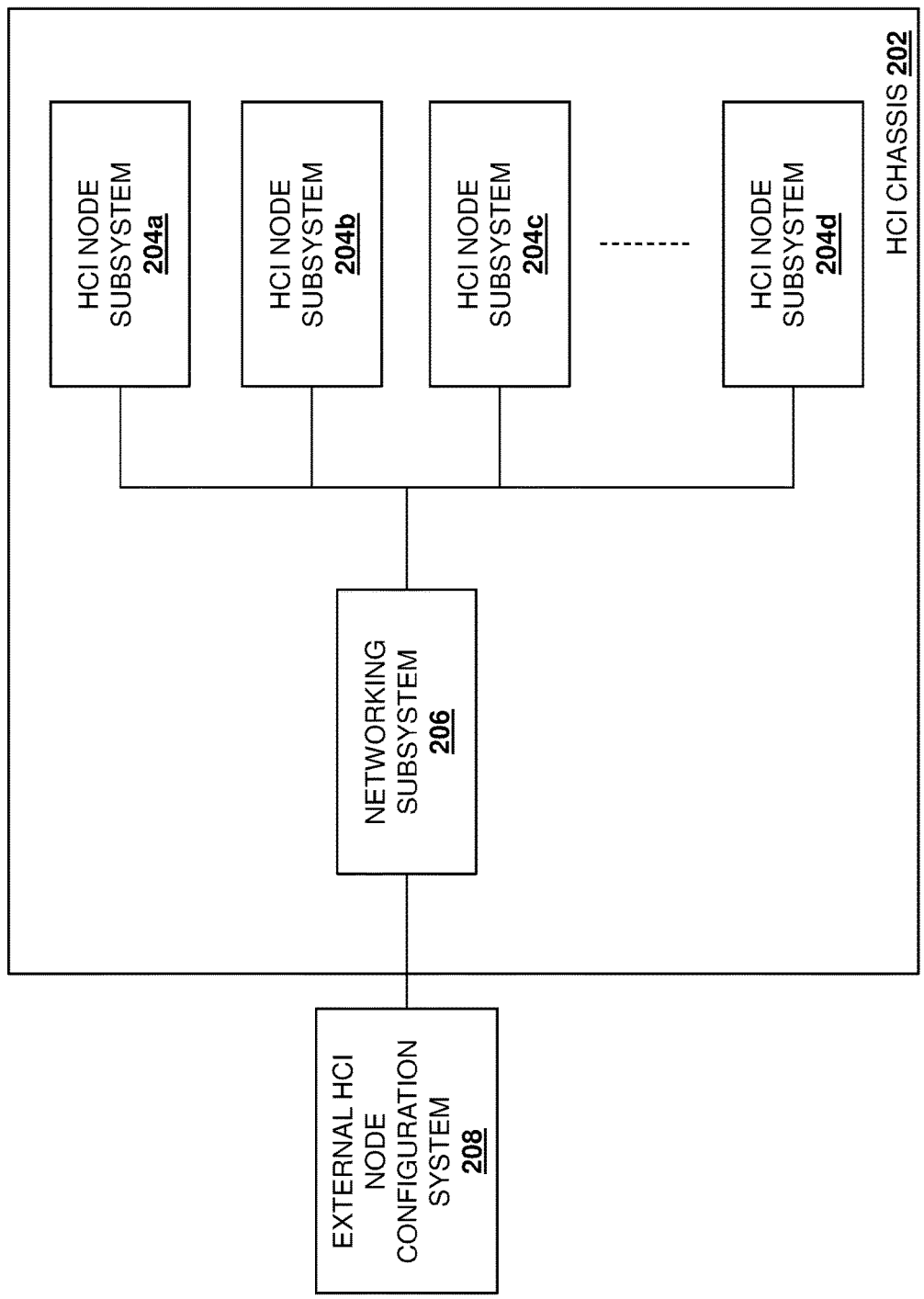
FIG. 2 is a schematic view illustrating an embodiment of an HCI networking configuration system.

Referring now to FIG. 2, an embodiment of a Hyper-Converged Infrastructure (HCI) system 200 is illustrated that may utilized the HCI networking configuration system of the present disclosure. In some embodiments, the HCI system 200 may be provided by the IHS 100 discussed above with reference to FIG. 1, and/or may include some or all of the components of the IHS 100. In the illustrated embodiment, the HCI system 200 includes an HCI chassis 202 that houses the components of the HCI system 200, only some of which are illustrated in FIG. 2. However, while illustrated and discussed as being provided in a single HCI chassis 202, one of skill in the art in possession of the present disclosure will recognize that an HCI system and/or HCI system components may be provided according to the teachings of the present disclosure may be provided in multiple chassis (or no chassis) while remaining within the scope of the present disclosure as well.

In the illustrated embodiment, the HCI chassis 202 houses a plurality of HCI node subsystems 204a, 204b, 204c, and up to 204d. In some embodiments, the HCI node subsystems 204a-204d may be provided by the IHS 100 discussed above with reference to FIG. 1, and/or may include some or all of the components of the IHS 100. In the examples provided below, the HCI node subsystems 204a-204d are provided by storage-dense server devices such as those provided by DELL EMC® VxRAIL Appliances available from DELL® Inc. of Round Rock, Tex., United States; DELL EMC® XC Series Appliances available from DELL® Inc. of Round Rock, Tex., United States; DELL EMC® vSAN Ready Nodes available from DELL® Inc. of Round Rock, Tex., United States; DELL EMC® VxFlex Ready Nodes available from DELL® Inc. of Round Rock, Tex., United States; DELL EMC® MICROSOFT® Storage Spaces Direct Ready Nodes available from DELL® Inc. of Round Rock, Tex., United States; and/or other HCI node subsystems that would be apparent to one of skill in the art in possession of the present disclosure. In particular embodiments discussed below, at least two of the HCI node subsystems 204a-204d are different from each other such that they each require different networking configurations (i.e., different HCI node subsystems may require the port(s) to which they are connected to be configured differently in order to communicate via a network accessible via those port(s)), discussed in further detail below.

In the illustrated embodiment, the HCI chassis 202 also houses a networking subsystem 206 that is coupled to each of the HCI node subsystems 204a-204d. In some embodiments, the networking subsystem 206 may be provided by the IHS 100 discussed above with reference to FIG. 1, and/or may include some or all of the components of the IHS 100. In the examples provided below, the networking subsystem 206 is provided by one or more switch devices such as DELL® PowerSwitch datacenter switch devices available from DELL® Inc. of Round Rock, Tex., United States. In the illustrated embodiment, the networking subsystem 206 is coupled to an external HCI node configuration system 208, either directly or via a network. As described below, the external HCI node configuration system 208 may be provided by one or more server devices, storage devices, and/or other subsystems that are configured to provide an external web portal, data store, and/or other HCI node configuration functionality discussed below. However, as also discussed below, in some embodiments the external HCI node configuration system 208 may be omitted while remaining within the scope of the present disclosure. While a specific HCI system 200 has been illustrated and described, one of skill in the art in possession of the present disclosure will recognize that the HCI networking configuration system of the present disclosure may include a variety of components and component configurations while remaining within the scope of the present disclosure as well.

Figure 3:
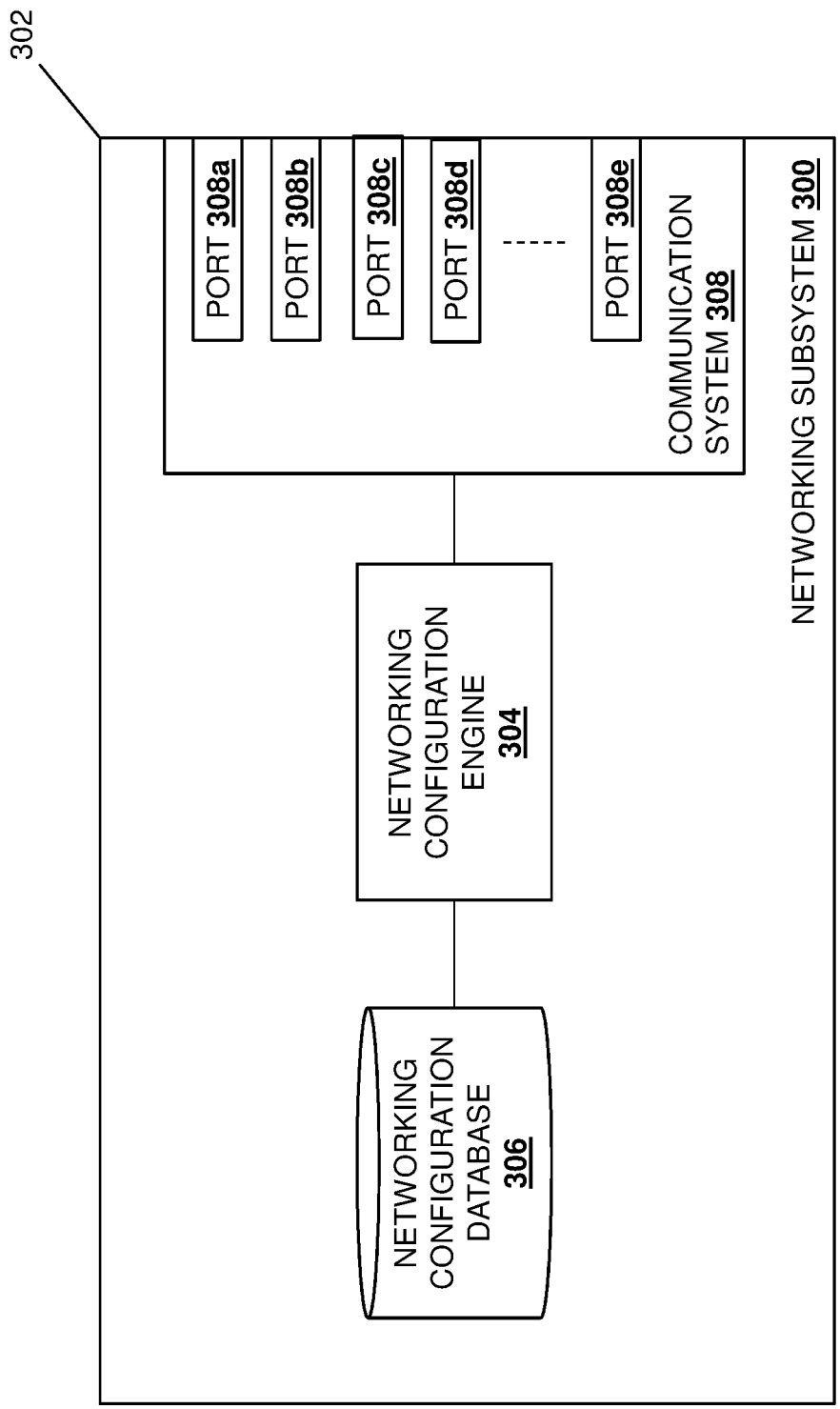
FIG. 3 is a schematic view illustrating an embodiment of a networking subsystem that may be included in the HCI networking configuration system of FIG. 2.

Referring now to FIG. 3, an embodiment of a networking subsystem 300 is illustrated that may provide the networking subsystem 206 discussed above with reference to FIG. 2. As such, the networking subsystem 300 may be provided by the IHS 100 discussed above with reference to FIG. 1 and/or may include some or all of the components of the IHS 100. Furthermore, while illustrated and discussed as being provided by one or more switch devices, one of skill in the art in possession of the present disclosure will recognize that the functionality of the networking subsystem 300 discussed below may be provided by other devices that are configured to operate similarly as the networking subsystem 300 discussed below. In the illustrated embodiment, the networking subsystem 300 includes a chassis 302 that houses the components of the networking subsystem 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking configuration engine 304 that is configured to perform the functionality of the networking configuration engines and/or networking subsystems discussed below.

The chassis 302 may also house a storage system (not illustrated, but which may include the storage 108 discussed above with reference to FIG. 1) that is coupled to the networking configuration engine 304 (e.g., via a coupling between the storage system and the processing system) and that includes a networking configuration database 306 that is configured to store any of the information utilized by the networking configuration engine 304 discussed below. In some specific examples discussed below, the storage system that provides the networking configuration engine 304 may include a persistent storage device. The chassis 302 may also house a communication system 308 that is coupled to the networking configuration engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, in the illustrated embodiment, the communication system 308 includes a plurality of ports 308a, 308b, 308c, 308d, and up to 308e, and as discussed below, one or more of the ports 308a-308e in the communication system 308 may be coupled to each the HCI node subsystems 204a-204d to enable communication between the networking configuration engine 304 and those HCI node subsystems 204a-204d (as well as to enable communication by those HCI node subsystems 204a-204d via a network accessible to the networking subsystem 206/300). While a specific networking subsystem 300 has been illustrated, one of skill in the art in possession of the present disclosure will recognize that networking subsystems (or other devices operating according to the teachings of the present disclosure in a manner similar to that described below for the networking subsystem 300) may include a variety of components and/or component configurations for providing conventional networking functionality, as well as the functionality discussed below, while remaining within the scope of the present disclosure as well.

Figure 4:
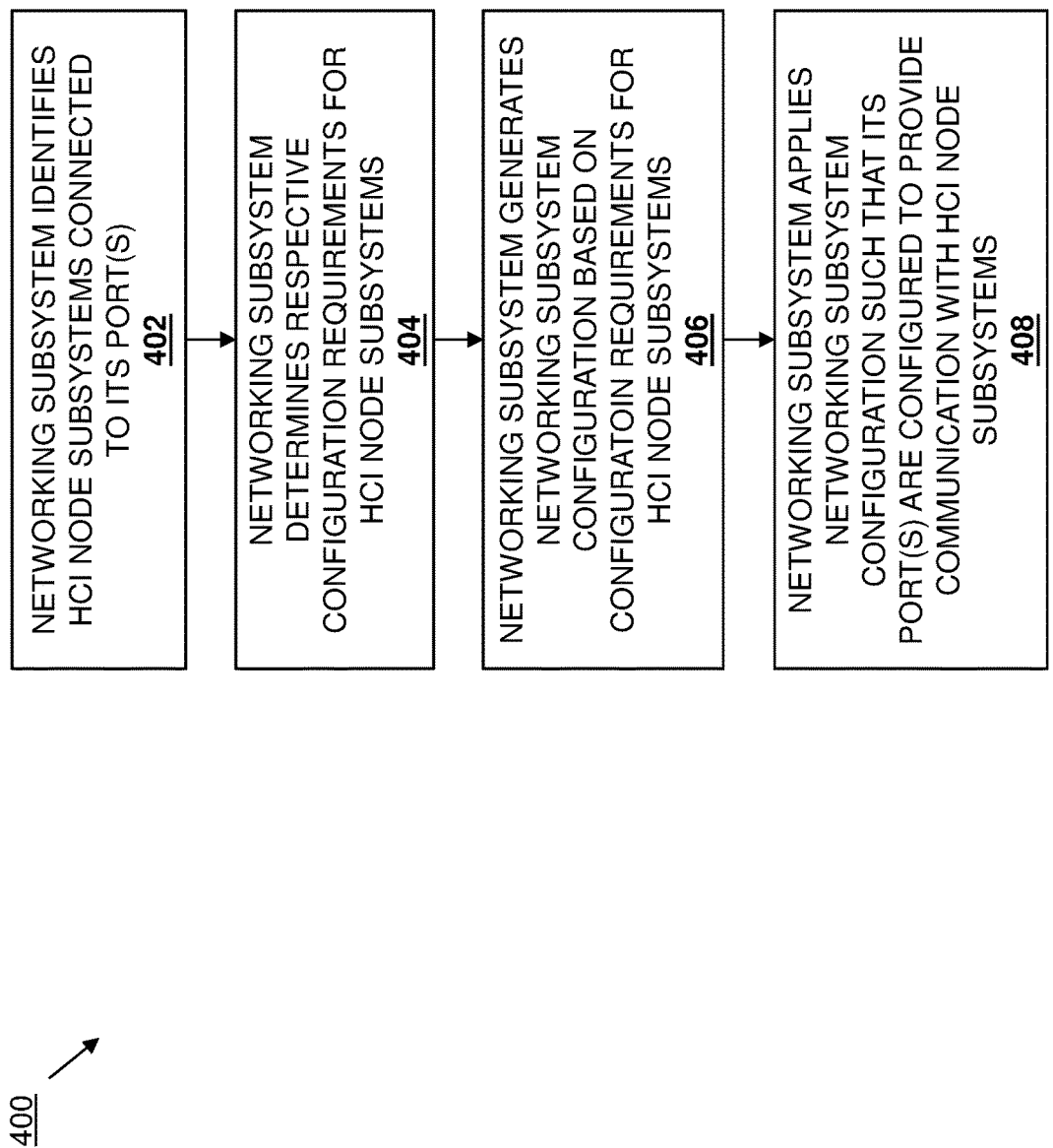
FIG. 4 is a flow chart illustrating an embodiment of a method for configuring networking for an HCI system.

Referring now to FIG. 4, an embodiment of a method 400 for configuring HCI networking is illustrated. As discussed below, embodiments of the systems and methods of the present disclosure provide a networking subsystem that discovers HCI node subsystems connected to it, identifies the types of those HCI node subsystems, and operates to configure its ports connected to those HCI node subsystems based on the types of those HCI node subsystems and the topology of the HCI fabric. In some embodiments, for each HCI node subsystem connected to a port on the networking subsystem, the networking subsystem may discover that HCI node subsystem and detect a model of that HCI node subsystem using in-band or out-of-band communication techniques that retrieve a unique identifier from those HCI node subsystems via respective identity modules in those HCI node subsystems. For example, the HCI node subsystems may be provided by storage-dense server devices, and the networking subsystem may identify a particular Software Defined Storage (SDS) type of those server devices. Based on the identity of each HCI node subsystem (e.g., the SDS type discussed above), the networking subsystem may access a predefined template (e.g., stored in the networking subsystem, accessible via a network, etc.) for that HCI node subsystem, and prompt a user to enter HCI topology details (e.g., whether the HCI fabric is in a converged topology or a non-converged topology, etc.) Using the template and HCI topology details, the networking device may generate a networking configuration and use that networking configuration to configure each port connected to one of the HCI node subsystems based on the specific networking requirements of that HCI node subsystem. As such, configuration of the networking for an HCI subsystem is greatly simplified and automated, reducing the time needed and error associated with conventional manual HCI networking configuration processes.

The method 400 begins at block 402 where a networking subsystem identifies HCI node subsystems connected to its port(s). In an embodiment, at block 402, the HCI system 200 may be provided by, for example, physically connecting the HCI node subsystems 204a-204d to the networking subsystem 206 in the HCI chassis 202, as illustrated in FIG. 2. For example, with reference to FIGS. 2 and 3, each of the HCI node subsystems 204a-204d may be connected (e.g., via an Ethernet cable or other coupling mechanism) to one or more of the ports 308a-308e in the communication system 308 in the networking subsystem 206/300. The HCI system 200 (e.g., the HCI node subsystems 204a-204d and the networking subsystem 206) may then be powered on, reset, and/or otherwise initialized, and at block 402 the networking configuration engine 304 in the networking subsystem 206/300 may operate to perform discovery operations that identify the HCI node subsystems 204a-204d connected to its ports 308a-308e. For example, at some point in the initialization of the HCI node subsystems 204a-204d, a "Solution Discovery and Configuration Service" (SDCS) may be activated on the networking configuration engine 304 in the networking subsystem 206/300, and the SDCS in the networking configuration engine 304 may utilize the Link Layer Discovery Protocol (LLDP), Cisco Discovery Protocol (CDP), or other discovery techniques known in the art in order to discover each of the HCI node subsystems 204a-204d. However, while a specific technique for discovering HCI node subsystems has been described, one of skill in the art in possession of the present disclosure will recognize that HCI node subsystems may be discovered in other manners that will fall within the scope of the present disclosure as well.

Figure 5A:
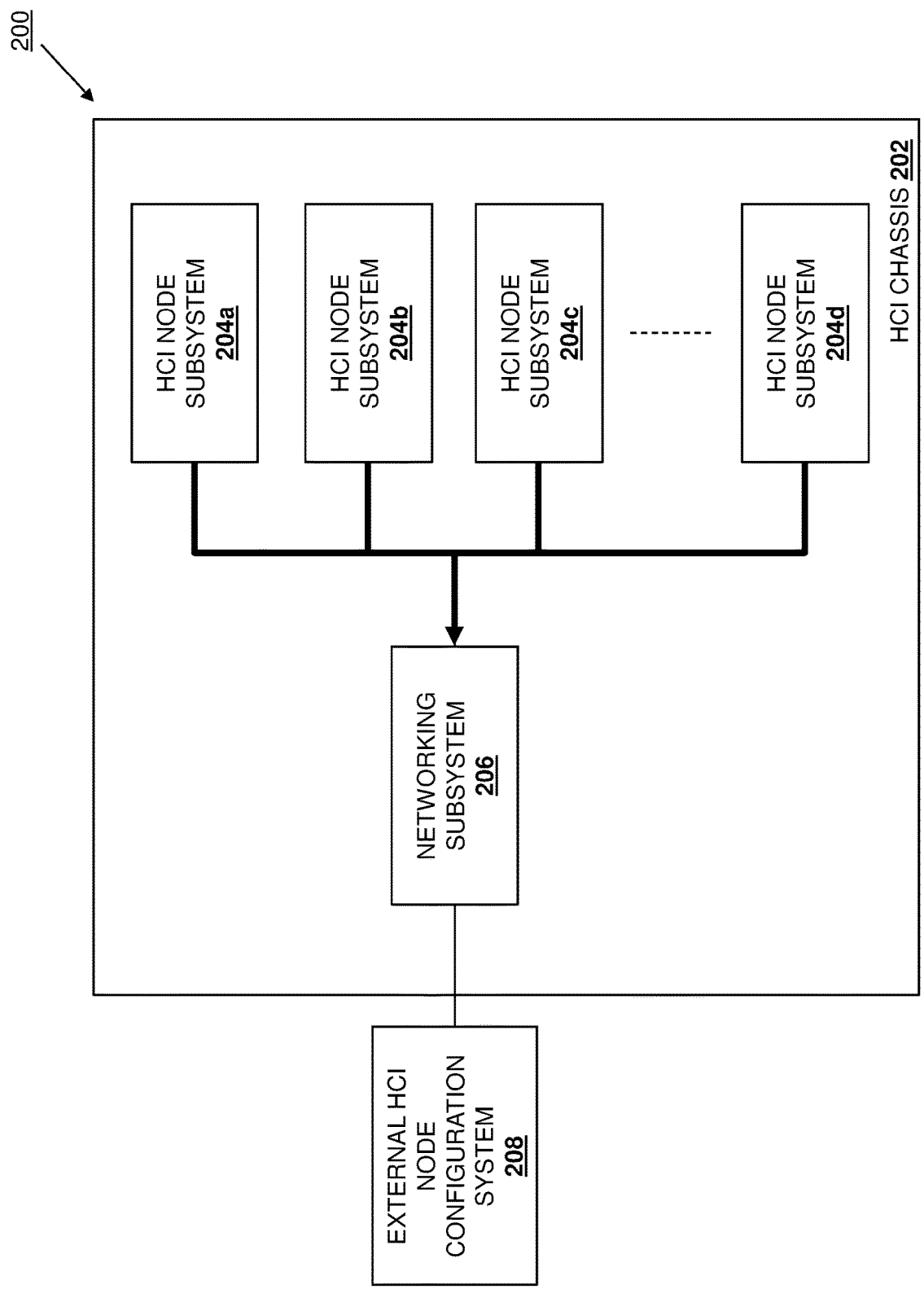
FIG. 5A is a schematic view illustrating an embodiment of the HCI networking configuration system of FIG. 2 operating during the method of FIG. 4.

Following the discovery of the HCI node subsystems 204a-204d, the SDCS in the networking configuration engine 304 in the networking subsystem 206/300 may send a request to each HCI node subsystem 204a-204d to read identification information about that HCI node subsystem 204a-204d. In some embodiments, each HCI node subsystem 204a-204d may be associated with identity information (e.g., a brand name such as "VxRail") that may be stored in an identity module in that HCI node subsystem 204a-204d, in a management controller (e.g., an integrated DELL® Remote Access Controller (iDRAC) available from DELL® Inc. of Round Rock, Tex., United States, a Baseboard Management Controller (BMC), etc.) that manages that HCI node subsystem, and/or in a variety of other storage locations that would be apparent to one of skill in the art in possession of the present disclosure. As will be appreciated by one of skill in the art in possession of the present disclosure, such identity information in the HCI node subsystems 204a-204d may be readable by the networking configuration engine 304 in the networking subsystem 206/300, as illustrated in FIG. 5A, from the management controller via an out-of-band communication connection to the management controller, or may be exposed to operating systems such that it is readable via an in-band communication connection to the HCI node subsystem as well. However, while a specific technique for identifying HCI node subsystems has been described, one of skill in the art in possession of the present disclosure will recognize that HCI node subsystems may be identified in other manners that will fall within the scope of the present disclosure as well.

The method 400 then proceeds to block 404 where the networking subsystem determines respective configuration requirements for the HCI node subsystems. In an embodiment, at block 404, the networking configuration engine 304 in the networking subsystem 206/300 may operate to determine configuration requirements for each of the HCI node subsystems 204a-204d that were discovered and identified at block 402. For example, for each HCI node subsystem 204a-204d for which identity information was obtained at block 402, the networking configuration engine 304 in the networking subsystem 206/300 may operate to determine a particular Software Defined Storage (SDS) type of that HCI node subsystem 204a-204d. For example, SDS types may include a Nutanix SDS type for HCI node subsystems available from NUTANIX® Inc. of San Jose, Calif., United States; a vSAN SDS type for HCI node subsystems available from VMWARE® Inc. of Palo Alto, Calif., United States; an S2D SDS type for HCI node subsystems available from MICROSOFT® Corporation of Redmond, Wash., United States; and/or other SDS types that would be apparent to one of skill in the art in possession of the present disclosure. However, while determining SDS types of the HCI node subsystems have been described, one of skill in the art in possession of the present disclosure will recognize that the identity information obtained for the HCI node subsystems may include a variety of other information for those HCI node subsystems that may be used to determine configuration requirements for those HCI node subsystems while remaining within the scope of the present disclosure as well.

In some embodiments, at block 404, the networking configuration engine 304 in the networking subsystem 206/300 may retrieve a predefined template for each HCI node subsystem 204a-204d based on the identity information obtained for that HCI node subsystem. For example, predefined templates for each HCI node subsystem 204a-204d may be retrieved based on the SDS type of that HCI node subsystem (although the use of other information about the HCI node subsystems to retrieve templates will fall within the scope of the present disclosure as well.) In some embodiments, predefined templates for the HCI node subsystems 204a-204d (e.g., for each SDS type of the HCI node subsystems 204a-204d) may be stored in the networking configuration database 306 (e.g., in an internal persistent storage that provides the networking configuration database 306 in the networking subsystem 206/300), and may be retrieved by the networking configuration engine 304 at block 404.

In other embodiments, predefined templates for the HCI node subsystems 204a-204d (e.g., for each SDS type of the HCI node subsystems 204a-204d) may be stored in the external HCI node configuration system 208 (e.g., and accessible via a web service such as a Fabric Design Center (FDC) external to the networking subsystem 206/300), and may be retrieved by the networking configuration engine 304 at block 404 via a network connection. In some examples, the retrieval of the predefined template for each HCI node subsystem 204a-204d may include the SDCS in the network configuration engine 304 mapping the identity information (e.g., the brand name of that HCI node subsystem) to a "solution mapping input file" (e.g., stored in the networking configuration database 306) to determine whether a predefined template for that HCI node subsystem exists in the network configuration database 306, or may connect via a network to the external HCI node configuration system 208 to retrieve an up-to-date solution mapping input file to determine whether a predefined template for that HCI node subsystem exists in a web portal provided by the external HCI node configuration system 208.

In some embodiments, after identifying the predefined template for each HCI node subsystem 204a-204d, the networking configuration engine 304 in the networking subsystem 206/300 may retrieve an HCI fabric topology and/or other HCI node subsystem/HCI system details from a user or administrator of the HCI system 200. For example, the networking configuration engine 304 in the networking subsystem 206/300 may utilize an internal web service (e.g., running on the networking subsystem 206/300) to open a portal with an HCI configuration page that allows a user to provide the HCI fabric topology of the HCI system 200 (e.g., a converged HCI fabric topology or a non-converged HCI fabric topology) and/or other HCI node subsystem/HCI system details associated with the predefined template for each HCI node subsystem. In another example, the networking configuration engine 304 in the networking subsystem 206/300 may direct a user or administrator of the HCI system 200 to an external web service (e.g., running on the external HCI node configuration system 208) with an external portal (e.g., the FDC discussed above) with an HCI configuration page that allows the user to provide the HCI fabric topology of the HCI system 200 (e.g., a converged HCI fabric topology or a non-converged HCI fabric topology) and/or other HCI node subsystem/HCI system details associated with the predefined template for each HCI node subsystem.

Following receiving the HCI fabric topology and/or other HCI node subsystem/HCI system details associated with the predefined template for each HCI node subsystem, the external HCI node configuration system 208 has the networking configuration requirements for each of the HCI node subsystems 204a-204d. As will be appreciated by one of skill in the art in possession of the present disclosure, the HCI fabric topology and/or other HCI node subsystem/HCI system details associated with the predefined template for each HCI node subsystem that are provided by the user or administrator of the HCI system 200 may include an identification of whether the HCI fabric topology is converged or non-converged; unique IP addresses for the HCI node systems; Remote Direct Memory Access (RDMA) requirements such as Quality of Service (QoS) and other network configuration settings; information about different logical networks such as storage networks, management networks, VM networks, backup networks, and/or other networks known in the art; details about VLANs associated with logical networks; MAC addresses for the physical network ports on the HCI node subsystem; mapping information that provides for the mapping of logical networks to physical networks (e.g., identifying physical ports that will carry storage data traffic via logical storage networks); information about any virtual networking/switch devices that are provided via an HCI node subsystem, and/or any other HCI node subsystem/HCI system details known in the art.

Figure 5B:
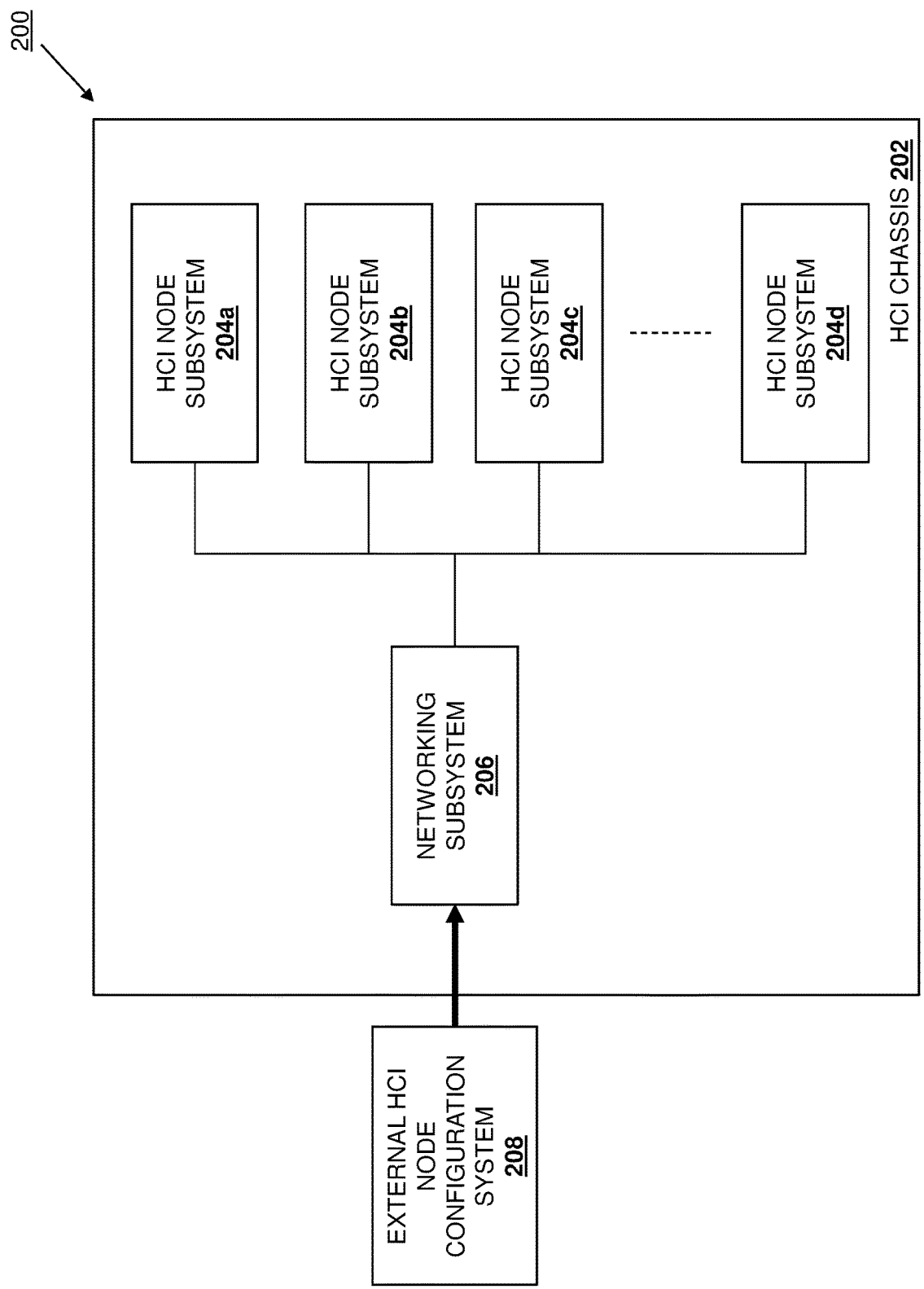
FIG. 5B is a schematic view illustrating an embodiment of the HCI networking configuration system of FIG. 2 operating during the method of FIG. 4.

In the case of the provisioning the HCI fabric topology and/or other HCI node subsystem/HCI system details via the external portal provided by the external web service, security may be enhanced by having the user or administrator of the HCI system 200 enter the HCI fabric topology details and/or other HCI node subsystem/HCI system details in the external portal/FDC, and receive a security code from the external HCI node configuration system 208. The user or administrator of the HCI system 200 may then provide that security code to the networking configuration engine 304 in the networking subsystem 206/300, which allows the networking configuration engine 304 to securely retrieve the associated configuration requirements, as illustrated in FIG. 5B. As such, at block 404, the networking configuration engine 304 in the networking subsystem 206/300 may have configuration requirements for each HCI node subsystem 204a-204d, which may include the predefined templates for each HCI node subsystem 204a-204d associated with the HCI fabric topology and/or other HCI node subsystem/HCI system details for the HCI system 200.

The method 400 then proceeds to block 406 where the networking subsystem generates a networking subsystem configuration based on the configuration requirements for the HCI node subsystems. In an embodiment, at block 406, the networking configuration engine 304 in the networking subsystem 206/300 may operate to generate a networking subsystem configuration based on the configuration requirements for each of the HCI node subsystems 204a-204d. Continuing with the examples above in which the networking configuration engine 304 in the networking subsystem 206/300 determines the configuration requirements directly (e.g., via direct retrieval of the HCI fabric topology of the HCI system 200 and/or other HCI node subsystem/HCI system details from the user or administrator of the HCI system 200), the SDCS in the networking configuration engine 304 may operate to use the HCI fabric topology and/or other HCI node subsystem/HCI system details for each HCI node subsystem 204a-204d to update the predefined template for that HCI node subsystem 204a-204d in order to generate a networking subsystem configuration that, includes configuration information for configuring the port(s) 308a-308e that are directly connected to that HCI node subsystem based on the networking configuration requirements of that HCI node subsystem.

Continuing with the examples above in which the networking configuration engine 304 in the networking subsystem 206/300 retrieves the configuration requirements determined by the external HCI node configuration system 208 (e.g., using the security code discussed above), the SDCS in the networking configuration engine 304 may operate to use the HCI fabric topology and/or other HCI node subsystem/HCI system details for each HCI node subsystem 204a-204d to update the predefined template for that HCI node subsystem 204a-204d in order to generate a networking subsystem configuration that, as discussed in further detail below, includes configuration information for configuring the port(s) 308a-308e that are directly connected to that HCI node subsystem based on the networking configuration requirements of that HCI node subsystem. However, while a few specific examples of generating networking subsystem configurations have been described, one of skill in the art in possession of the present disclosure will recognize that a variety of techniques for generating networking subsystem configurations will fall within the scope of the present disclosure as well. For example, while the networking configuration engine 304 has been described as "generating" the networking subsystem configuration using the configuration requirements provided by the HCI fabric topology of the HCI system 200 and/or other HCI node subsystem/HCI system details provided for the predefined template, in some examples the HCI fabric topology of the HCI system 200 and/or other HCI node subsystem/HCI system details provided for the predefined template may also provide (e.g., without modification) the networking subsystem configuration, and thus the "generating" of the networking subsystem configuration may include the retrieval of the HCI fabric topology of the HCI system 200 and/or other HCI node subsystem/HCI system details, the retrieval of the associated configuration requirements, and/or any other operations that would be apparent to one of skill in the art in possession of the present disclosure.

Figure 5C:
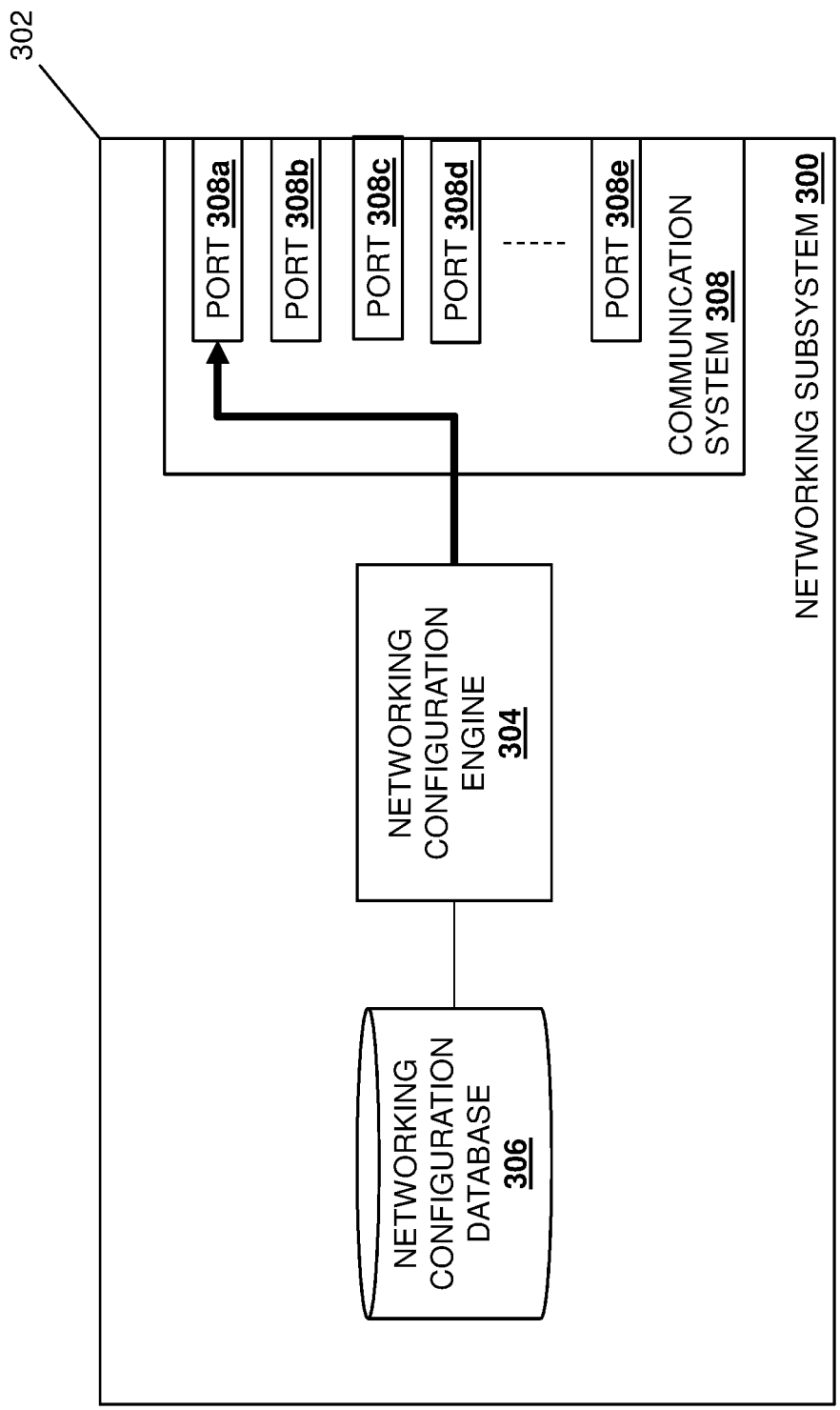
FIG. 5C is a schematic view illustrating an embodiment of the HCI networking configuration system of FIG. 2 operating during the method of FIG. 4.
Figure 5D:
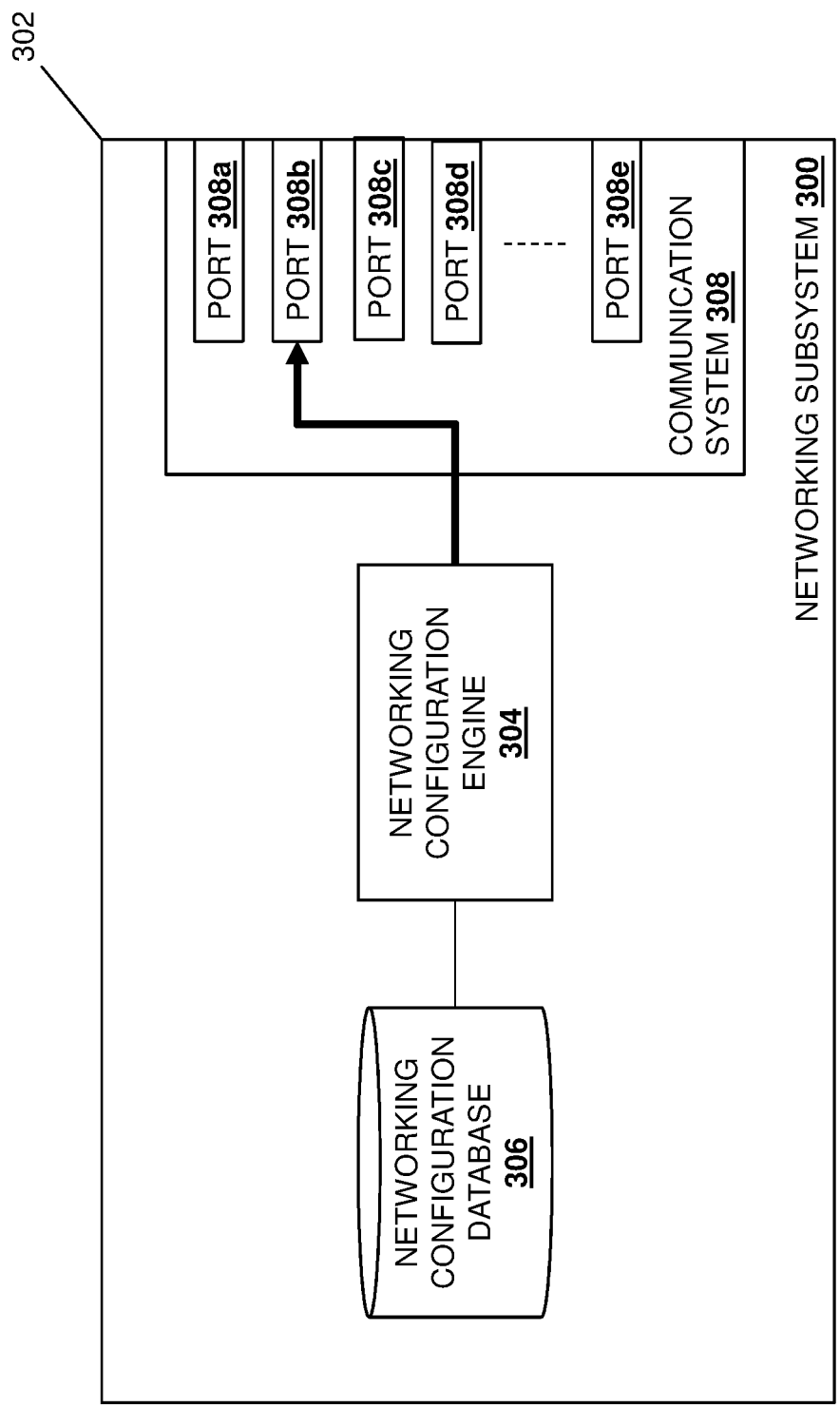
FIG. 5D is a schematic view illustrating an embodiment of the HCI networking configuration system of FIG. 2 operating during the method of FIG. 4.

The method 400 then proceeds to block 408 where the networking subsystem applies the networking subsystem configuration such that its port(s) are configured to provide communications with the HCI node subsystems. In an embodiment, at block 408, the networking configuration engine 304 in the networking subsystem 206/300 may utilize the networking subsystem configuration generated at block 406 to configure itself such that its ports 308a-308e connected to the HCI node subsystems 204a-204d are configured to provide communications between the networking subsystem 206 and the HCI node subsystems 204a-204d. With reference to FIGS. 5C and 5D, the networking configuration engine 304 is illustrated as configuring the port 308a with a first configuration for a first HCI node subsystem (e.g., the HCI networking subsystem 204a), and configuring the port 308b with a second configuration for a second HCI node subsystem (e.g., the HCI networking subsystem 204b) that is different than the first configuration for the first HCI node subsystem.

One of skill in the art in possession of the present disclosure will appreciate how the networking subsystem configuration generated as discussed above may include any networking subsystem configuration information that provides for the configuration of ports connected to particular HCI node subsystems with particular networking configuration requirements while remaining within the scope of the present disclosure. For example, ports configurations provided using the network subsystem configuration may include Virtual Local Area Network (VLAN) configurations such as trunk mode information, a number of VLANs, different subnets; flow control information (e.g., whether Data Center Bridging (DCB) is enabled); and/or any of a variety of other port configuration details that would be apparent to one of skill in the art in possession of the present disclosure.

In a specific example of port configuration requirements, consider an HCI node in the HCI node subsystem 204a that is configured in a non-converged HCI topology, with its first NIC connecting to the port 308a on the networking subsystem 206/300, and its second NIC connecting to the port 308e on the networking subsystem 206/300. The first NIC connecting to port 308a may be used for storage data traffic and thus may be configured with RDMA requirements, which may require the port 308a to be configured with Data Center Bridging (DCB) to allow for the transmittal of the storage data traffic via storage data traffic VLANs. Furthermore, the second NIC connecting to port 308e from the same HCI node may provide a connection to an internal virtual switch that provides VM/Management/Backup data traffic, and each of these are separate logical networks that require the port 308e to be configured in a trunk mode in order to allow multiple VLANs (each associated with a respective logical network) to transmit their respective data traffic. Further still, with multiple logical networks present on the port 308e, that port 308e may be configured with QoS configurations and different bandwidth percentages allocated to each of those logical networks. In a specific example, a VM network may be given a larger share (e.g., 60% bandwidth) relative to the management network (e.g., 10% bandwidth) and the backup network (e.g., 30% bandwidth.) Finally, in some embodiments, multiple different HCI node types may be connected to the same networking device in the networking subsystem 206/300 and, as such, port 308b may be connected to a vSAN-based HCI subsystem, while port 308c may be connected to an S2D-based HCI subsystem. As will be appreciated by one of skill in the art in possession of the present disclosure, an S2D-based HCI subsystem may require RDMA configurations that require its connected port 308c be configured for DCB, while the vSAN-based HCI subsystem does not support RDMA and thus does not have such a configuration requirement for port 308b. As such, following block 408, the networking subsystem 206 may provide communications received from external computing devices (e.g., connected to the networking subsystem 206 via a network) to the HCI node subsystems 204a-204d via the configured ports 308a-308e, and vice versa.

Thus, systems and methods have been described that provide a switch device that discovers HCI server devices connected to it, identifies the types of those HCI server devices, and operates to configure its ports connected to those HCI server devices based on the types of those HCI server devices and the topology of the HCI fabric. In some embodiments, for each HCI server device connected to a port on a switch device, that switch device may discover that HCI server device and detect a model of that HCI server device using in-band or out-of-band communication techniques that retrieve a unique identifier from that HCI server device from an identity module in that HCI server device. For example, the switch device may identify a particular Software Defined Storage (SDS) type of each server device, and based on the identity of the HCI server devices (e.g., the SDS type discussed above), the switch device may access predefined templates (e.g., stored in the switch device, available via a network, etc.) for each different HCI server device, and prompt a user to enter HCI topology details (e.g., whether the HCI fabric is in a converged topology or a non-converged topology) and/or other HCI server device details known in the art. Using the predefined templates, HCI topology details, and/or the other HCI server device details, the switch device may generate a switch configuration and use that switch configuration to configure each port connected to one of the HCI server devices based on the specific networking requirements of that HCI server device. As such, configuration of the networking for an HCI subsystem is greatly simplified and automated, reducing the time needed and error associated with conventional manual HCI networking configuration processes.

Figure 6:
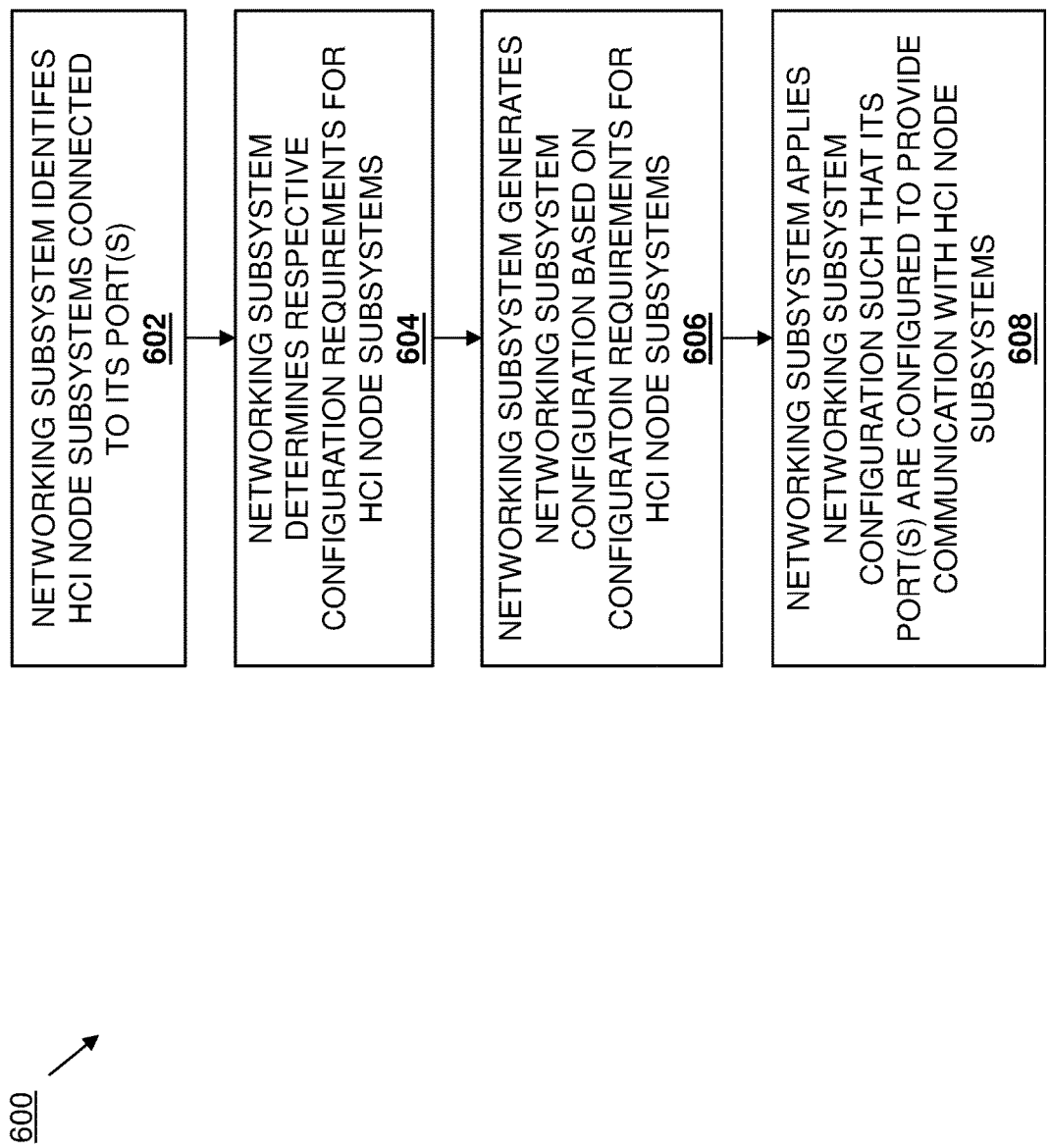
FIG. 6 is a flow chart illustrating an embodiment of a method for configuring networking for an HCI system.

Referring now to FIG. 6, another embodiment of a method 600 for configuring HCI networking is illustrated. As discussed below, the systems and methods of the present disclosure provide a networking subsystem that discovers HCI node subsystems connected to it, and operates to automatically configure its ports connected to those HCI node subsystems based on the types of those HCI node subsystems and the topology of the HCI fabric. In some embodiments, HCI node subsystem configuration profiles may be created and hosted on a configuration profile share database, a management subsystem provided with the HCI node subsystem, or an operating system provided with the HCI node subsystem. Subsequently, for each HCI node subsystem connected to a port on a networking subsystem, the networking subsystem may discover that HCI node subsystem and retrieve the HCI node subsystem configuration profile for that HCI node subsystem. The networking subsystem may then parse each HCI node subsystem configuration profile to identify logical networking configuration portions of that HCI node subsystem configuration profile, and map those logical networking configuration portions to the port(s) connected to that HCI node subsystem. The networking subsystem may then use the individual, per-port mapped logical networking configuration portions/ports to generate a networking subsystem configuration, and apply the networking subsystem configuration to its ports connected to HCI node subsystems. As such, configuration of the networking for an HCI subsystem is greatly simplified and automated, reducing the time needed and error associated with conventional manual HCI networking configuration processes.

Figure 7:
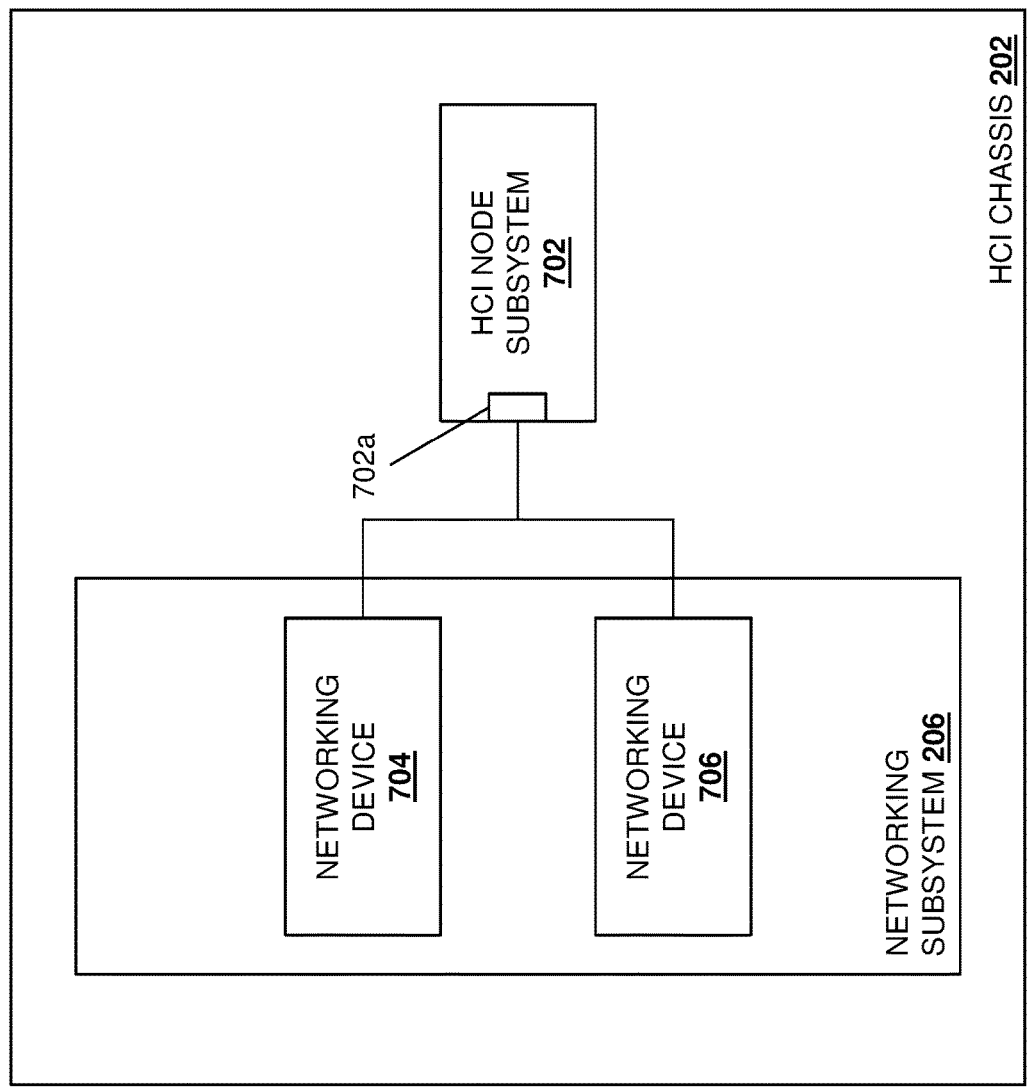
FIG. 7 is a schematic view illustrating an embodiment of the HCI networking configuration system of FIG. 2.

In some embodiments, prior to the method 600, HCI node subsystem configuration profiles may be generated and stored. With reference to FIG. 7, an embodiment of a specific HCI system 700 included in the HCI chassis 202 discussed above with reference to FIG. 2 is illustrated. As will be recognized by one of skill in the art in possession of the present disclosure, the HCI system 700 provides an example of a fully converged HCI topology, with the HCI node subsystem 702 including a Network Interface Controller (NIC) 702a with a first port connected to a first networking device 704 (e.g., a first Top Of Rack (TOR) switch device) in the networking subsystem 206, and with a second port connected to a second networking device 706 (e.g., a second TOR switch device) in the networking subsystem 206. As will be appreciated by one of skill in the art in possession of the present disclosure, the fully converged HCI topology is referred to as such due to all storage and management data traffic (e.g., Remote Direct Memory Access (RDMA) and Transport Control Protocol/Internet Protocol (TCP/IP) data traffic) converging on the NIC 702a. Furthermore, while illustrated as included in the HCI chassis 202, one of skill in the art in possession of the present disclosure will recognize that any of the HCI components in the HCI system 700 may be included in separate chassis (e.g., each HCI node in the HCI node subsystem 702, each networking device 704 and 706 in the networking subsystem 206, etc.) while remaining within the scope of the present disclosure as well.

Figure 8:
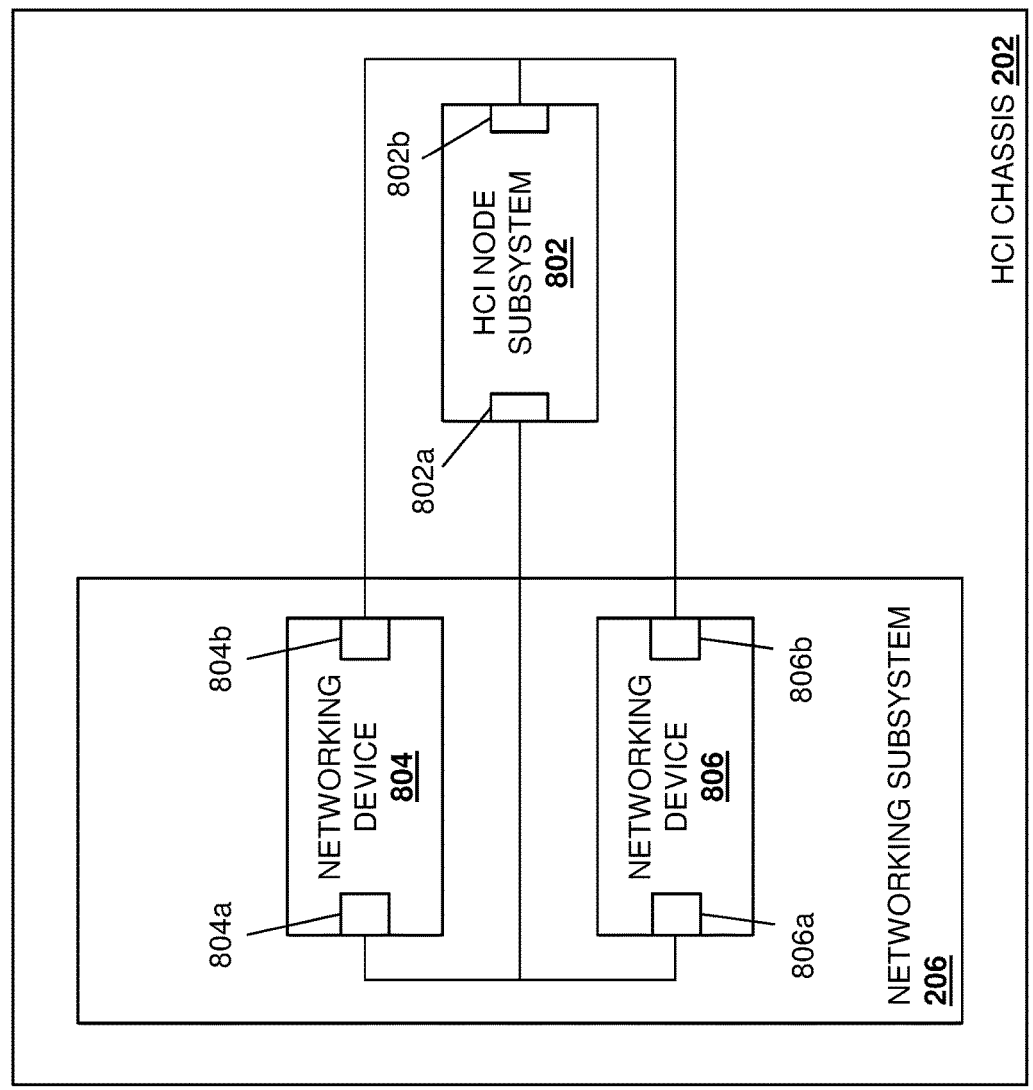
FIG. 8 is a schematic view illustrating an embodiment of the HCI networking configuration system of FIG. 2.

With reference to FIG. 8, an embodiment of a specific HCI system 800 included in the HCI chassis 202 discussed above with reference to FIG. 2 is illustrated. As will be recognized by one of skill in the art in possession of the present disclosure, the HCI system 800 provides an example of a non-converged HCI topology, with the HCI node subsystem 802 including a first Network Interface Controller (NIC) 802a with a first port connected to a first port 804a on a first dual-port networking device 804 (e.g., a first TOR switch device) in the networking subsystem 206, and with a second port connected to a first port 806a on a second dual-port networking device 806 (e.g., a second TOR switch device) in the networking subsystem 206, as well as a second NIC 802b with a first port connected to a second port 804b on the first dual-port networking device 804 in the networking subsystem 206, and with a second port connected to a second port 806b on the second dual-port networking device 806 in the networking subsystem 206. As will be appreciated by one of skill in the art in possession of the present disclosure, the non-converged HCI topology is referred to as such due to storage and management data traffic being separated, with storage data traffic (e.g., RDMA data traffic) being provided on the NIC 802*a*, and management data traffic as well as Virtual Machine (VM) data traffic (e.g., TCP/IP data traffic) being provided on the NIC 802*b*.

As will be appreciated by one of skill in the art in possession of the present disclosure, different permutations of the HCI topology exist such as, for example, with the use of multiple dual-port storage NICs that can transmit data traffic for four storage networks, or be configured to connect to a separate Switch Embedded Teaming (SET) switch for storage replication and/or backup operations. The configuration flexibility offered by HCI systems such as those described above results in a large number of possible configuration permutations, and each require the networking subsystem to be configured differently based on the logical/host network configurations for the HCI node subsystems connected to them. In an embodiment, the HCI node subsystem configuration profiles may be generated using configuration management tools or platforms such as, for example, the PowerShell Desired State Configuration (DSC) tool available from MICROSOFT® of Redmond, Wash., United States; the CHEF® tool available from CHEF® of Seattle, Wash., United States; the open-source ANSIBLE® tool; the open source PUPPET® tool, and/or other configuration management tools or platforms that would be apparent to one of skill in the art in possession of the present disclosure.

For example, a set of inputs for any particular HCI node subsystem may be provided in a logical configuration Domain Specific Language (DSL) file and via a logical configuration mapper to the to the configuration management tools or platforms discussed above, which may then use the set of inputs to generate a corresponding host/HCI node subsystem configuration profile that may be then stored in a configuration share database (e.g., provided in the external HCI node configuration system 208 discussed above with reference to FIG. 2), in a management subsystem (e.g., an iDRAC or BMC discussed above) via an out-of-band network communication, or in operating system in the host/HCI node subsystem via an in-band network communication. As will be appreciated by one of skill in the art in possession of the present disclosure, such host/HCI node subsystem configuration profiles include details about the logical configuration of software components on the host/HCI node subsystem, including the host/HCI node subsystem networking configuration. However, while specific examples of the generation of host/HCI node subsystem configuration profiles have been described, one of skill in the art in possession of the present disclosure will recognize that host/HCI node subsystem configuration profiles may be determined in a variety of other manners that will fall within the scope of the present disclosure as well.

The method 600 begins at block 602 where a networking subsystem identifies HCI node subsystems connected to its port(s) In an embodiment, the networking configuration engine 304 in the networking subsystem 206 may provide a switch configuration manager that perform the functionality described below, and one of skill in the art in possession of the present disclosure will recognize that a networking configuration engine similar to the networking configuration engine 304 described below may be provided in each networking device in the networking subsystem 206 and may perform similar functionality. At block 602, the switch configuration manager provided by the networking configuration engine 304 may discover each HCI node subsystem 204*a*-204*d* connected to its ports 308*a*-308*e*, connect to each of those HCI node subsystems 204*a*-204*d* on a per-port basis, retrieve the host/HCI node subsystem configuration profile for that HCI node subsystem, and store the host/HCI node subsystem configuration profiles in the networking configuration database 306 (e.g., provided by a persistent storage in the networking subsystem 206.) As discussed below, the networking configuration database 306 may also store historical data associated with port configurations, which one of skill in the art in possession of the present disclosure will recognize allows for tracking and review of how a port has been configured.

For example, in situations in which a host operating system is installed on the host/HCI node subsystem, the host/HCI node subsystem configuration profile may be retrieved from that host operating system via Link Layer Discovery Protocol (LLDP) operations with the NIC in that host/HCI node subsystem that is connected to the port on the networking subsystem 206/300. In another example, the host/HCI node subsystem configuration profile may be retrieved via out-of-band communications with the management controller (e.g., an iDRAC or BMC) that provides for management of that host/HCI node subsystem. In another example, the host/HCI node subsystem configuration profile may be retrieved from a configuration share database provided in, for example, the external HCI node configuration system 208. However, while several examples of the retrieval of host/HCI node configuration profiles have been described, one of skill in the art in possession of the present disclosure will recognize that host/HCI node subsystem configuration profiles may be retrieved in a variety of manners that will fall within the scope of the present disclosure as well. Thus, following block 602, host/HCI node subsystem configuration profiles may have been retrieved and stored for each HCI node subsystem 204*a*-204*d* connected to the networking subsystem 206.

The method 600 then proceeds to block 604 where the networking subsystem determines respective configuration requirements for the HCI node subsystems. In an embodiment, the switch configuration manager provided by the networking configuration engine 304 may include a configuration parser, and at block 604 the configuration parser may operate to parse through the host/HCI node subsystem configuration profile retrieved for each HCI node subsystem, and identify the corresponding logical host/HCI node subsystem networking details in each host/HCI node subsystem configuration profile, the corresponding NIC-related details in each host/HCI node subsystem configuration profile (e.g., a NIC type, a NIC vendor, a NIC speed, a Media Access Control (MAC) address, etc.), and/or any other host/HCI node subsystem networking details that would be apparent to one of skill in the art in possession of the present disclosure. The configuration parser in the switch configuration manager provided by the networking configuration engine 304 may then save the host/HCI node subsystem networking details (e.g., by "stripping out" the host/HCI node subsystem networking details from each host/HCI node subsystem configuration profile) to the networking configuration database 306 (e.g., provided by a persistent storage in the networking subsystem 206), and associate those host/HCI node subsystem networking details with their associated host/HCI node subsystem (e.g., by tagging the host/HCI node subsystem networking details to their associated HCI node subsystem and saving them as a JavaScript Object Notation (JSON) file.) However, while a specific example of determining configuration requirements for HCI node subsystems have been described (e.g., via the stripping out of host/HCI node subsystem networking details from host/HCI node subsystem configuration profiles), one of skill in the art in possession of the present disclosure will recognize that configuration requirements for an HCI node subsystem may be determined in a variety of manners that will fall within the scope of the present disclosure as well.

In an embodiment, the switch configuration manager provided by the networking configuration engine 304 may include a port configuration mapper, and at block 604 the port configuration mapper may operate to access the logical host/HCI node subsystem networking details, the NIC-related details, and/or any other host/HCI node subsystem networking details identified and stored by the configuration parser for each HCI node subsystem 204a-204d, and associate the host/HCI node subsystem and the NIC type of its NIC with the port connected to that host/HCI node subsystem via that NIC (e.g., by tagging that port with the HCI node subsystem name and NIC type) in order to create logical per-port host/HCI node subsystem configurations for each of its ports 308a-308e connected to an HCI node subsystem.

In embodiments in which there are multiple NICs present according to the host/HCI node subsystem networking details for any particular HCI node subsystem, the configuration mapper may use a MAC address in the NIC-related details to identify any additional connections of that HCI node subsystem to the networking subsystem 206/300, as well as identify if multiple ports 308a-308e on the networking subsystem 206/300 are connected to that HCI node subsystem, and identify the types of NICs in that HCI node subsystem are connected to each of those ports. The configuration mapper may then update the host/HCI node subsystem networking details by, for example, mapping port(s) to storage subsystems in the HCI node subsystem where appropriate, mapping port(s) to management/VM subsystems in the HCI node subsystem where appropriate, and/or performing other mapping operations that would be apparent to one of skill in the art in possession of the present disclosure, as well as associating those mappings (e.g., "tagging") with the identified ports (e.g., "storage" ports, "management/VM" ports, etc.) In some embodiments, metadata about the operations being performed by the configuration mapper may be saved to assist in capturing historical details about configuration changes on a per-port basis.

The method 600 then proceeds to block 606 where the networking subsystem generates a networking subsystem configuration based on the configuration requirements for the HCI node subsystems. In an embodiment, the switch configuration manager provided by the networking configuration engine 304 may include a switch configuration generator, and at block 606 the switch configuration generator may operate to use the logical per-port host/HCI node subsystem configurations to create a networking subsystem configuration by, for example, using each logical per-port host/HCI node subsystem configuration for each of its ports connected to an HCI node subsystem to generate a respective physical per-port host/HCI node subsystem configuration for those ports, and then saving those physical per-port host/HCI node subsystem configurations for each of its ports in the networking configuration database 306 in association with (e.g., mapped to) the logical per-port host/HCI node subsystem configurations for those ports.

Continuing with the specific example illustrated in FIG. 8, the non-converged HCI topology includes the multiple NICs 802a and 802b on the HCI node subsystem 802 connected to each networking device 804 and 806, with the NIC 802a carrying storage data traffic, and the NIC 802b carrying management/VM data traffic. As will be appreciated by one of skill in the art in possession of the present disclosure, the configurations for the "storage" port(s) connected to the NIC 802a requires RDMA configurations that are different than the configurations provided for the "management/VM/backup" ports connected to the NIC 802b (which may simply need to be configured in a "trunk" mode to allow for different VLANs.) As will be appreciated by one of skill in the art in possession of the present disclosure, the logical per-port host/HCI node subsystem configuration-physical per-port host/HCI node subsystem configuration mappings may allow for such differing configurations on the ports 308a-308e of the networking subsystem 206.

The switch configuration generator may then combine those physical per-port host/HCI node subsystem configurations into a single file that provides the networking subsystem configuration, stitch those physical per-port host/HCI node subsystem configurations together to provide the networking subsystem configuration, translate those physical per-port host/HCI node subsystem configurations into a networking subsystem configuration, and/or performing a variety of other operations that one of skill in the art in possession of the present disclosure would recognize would provide a networking subsystem configuration from the physical per-port host/HCI node subsystem configurations discussed above. As will be appreciated by one of skill in the art in possession of the present disclosure, the generation of the networking subsystem configuration using the physical per-port host/HCI node subsystem configurations at block 606 may include configuring link aggregations (e.g., Virtual Link Trunking (VLT) link aggregations) that may be utilitized when multiple networking devices are provided in the networking subsystem 206.

In embodiments in which multiple networking devices provide the networking subsystem 206 (e.g., as illustrated in FIGS. 7 and 8), each of those networking devices may generate separate networking device configurations similarly as described above, and then may compare them to ensure that they are consistent. As such, a first networking device may retrieve a second networking device configuration generated by a second networking device, and compare it to the first networking device configuration generated by the first networking device in order to determine whether the first networking device configuration and the second networking device configuration are consistent, that all ports on a particular NIC type on each HCI node subsystem are connected to the same ports on both of the first networking device and the second networking device (e.g., if NIC type A on an HCI node subsystem is connected to port 1 on a first networking device in the networking subsystem, and NIC type B on the HCI node subsystem is connected to port 8 on the first networking device in the networking subsystem, then the same should be true on the second networking device in the networking subsystem), and/or perform any other consistency determination operations that would be apparent to one of skill in the art in possession of the present disclosure. As will be appreciated by one of skill in the art in possession of the present disclosure, such networking device consistency determination operations may be useful in detecting cabling errors between the HCI node subsystem and the networking devices as well.

The method 600 then proceeds to block 608 where the networking subsystem applies the networking subsystem configuration such that its port(s) are configured to provide communications with the HCI node subsystems. In an embodiment, the switch configuration manager provided by the networking configuration engine 304 may include a switch configuration applicator, and at block 608 the switch configuration applicator may operate to apply the networking subsystem configuration generated at block 606 to its ports 308*a*-308*e* one port at a time. As will be appreciated by one of skill in the art in possession of the present disclosure, the application of the networking subsystem configuration one port at a time will operate to instantiate all of the logical host/HCI node subsystem network, while also providing a check of whether there are collisions associated with the host/HCI node subsystem IP addresses. As such, the application of the networking subsystem configuration one port at a time may operate as a safe guard mechanism to ensure that there are no duplicate IP addresses on the network, as well as to identify the port (and subsequently the HCI node subsystem) in the event an IP address conflict exists.

Thus, systems and methods have been described that provide a switch device that discovers HCI server devices connected to it, and operates to automatically configure its ports connected to those HCI server devices based on the types of those HCI server devices and the topology of the HCI fabric. In some embodiments, HCI server device configuration profiles may be created and hosted on either a configuration profile share database, a management subsystem provided with the HCI server device, or an operating system provided with the HCI server device. Subsequently, for each HCI server device connected to a port on a switch device, that switch device may discover those HCI server devices and retrieve the HCI server device configuration profiles for those HCI server devices. The switch device may then parse each HCI server device configuration profile to identify logical networking configuration portions of the HCI server device configuration profiles, and map those logical networking configuration portions to the port(s) connected to those HCI server devices. The switch device may then use the individual, per-port mapped logical networking configuration portions/ports to generate a switch device configuration, and apply the switch device configuration to its ports connected to HCI server devices. As such, configuration of the networking for an HCI subsystem is greatly simplified and automated, reducing the time needed and error associated with conventional manual HCI networking configuration processes.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Hyper-Converged Infrastructure (HCI) networking configuration system, comprising:
   a plurality of Hyper-Converged Infrastructure (HCI) node subsystems, wherein at least one first HCI node subsystem that is included in the plurality of HCI node subsystems is associated with different configuration requirements than at least one second HCI node subsystem that is included in the plurality of HCI node subsystems; and
   a networking subsystem that is coupled to each of the plurality of HCI node subsystems via at least one respective port included on the networking subsystem, wherein the networking subsystem is configured to:
      identify each of the plurality of HCI node subsystems;
      determine, based at least in part on the identification of each of the plurality of HCI node subsystems, respective configuration requirements for each of the plurality of HCI node subsystems, wherein respective first configuration requirements for the at least one first HCI node subsystem are different than respective second configuration requirements for the at least one second HCI node subsystem;
      generate, based on the respective configuration requirements for each of the plurality of HCI node subsystems, a networking subsystem configuration that includes first port configuration information for each of the at least one respective port coupled to the at least one first HCI node subsystem, and second port configuration information for each of the at least one respective port coupled to the at least one second HCI node subsystem, wherein the first port configuration information is different than the second port configuration information; and
      apply the networking subsystem configuration to the networking subsystem such that the first port configuration information is applied to each of the at least one respective port on the networking subsystem that is coupled to the at least one first HCI node subsystem, and the second port configuration information is applied to each of the at least one respective port on the networking subsystem that is coupled to the at least one second HCI node subsystem, and such that each respective port on the networking subsystem is configured to provide communication between the networking subsystem and that HCI node subsystem.

2. The system of claim 1, wherein the determining the respective configuration requirements for each of the plurality of HCI node subsystems includes:
   retrieving, based on the identification of each of the plurality of HCI node subsystems, a respective configuration template for each of the plurality of HCI node subsystems;
   receiving, from a user, respective configuration information in each respective configuration template; and
   determining, using the respective configuration information and respective configuration templates, the respective configuration requirements for each of the plurality of HCI node subsystems.

3. The system of claim 2, wherein the retrieving the respective configuration template for each of the plurality of HCI node subsystems includes at least one of:
   retrieving the respective configuration template for at least one of the plurality of HCI node subsystems from a storage system that is included in the networking subsystem; and
   retrieving the respective configuration template for at least one of the plurality of HCI node subsystems via a network.

4. The system of claim 1, wherein the identification of each of the plurality of HCI node subsystems includes:
   retrieving a respective identification of each of the plurality of HCI node subsystems via an identity module included in that HCI node subsystem.

5. The system of claim 1, wherein the determining the respective configuration requirements for each of the plurality of HCI node subsystems includes:
   retrieving HCI node subsystem host configuration information from each of the plurality of HCI node subsystems;

identifying, in the HCI node subsystem host configuration information for each of the plurality of HCI node subsystems, respective logical HCI node subsystem host networking configuration sub-information and physical HCI node subsystem host networking configuration sub-information for each of the plurality of HCI node subsystems; and generating, using the respective logical HCI node subsystem host networking configuration sub-information and physical HCI node subsystem host networking configuration sub-information identified for each of the plurality of HCI node subsystems, a per-port configuration information for each at least one respective port connected to that HCI node subsystem.

6. The system of claim 5, wherein the generating the networking subsystem configuration includes:

combining the per-port configuration information generated for the plurality of HCI node subsystems to generate the networking subsystem configuration.

7. An Information Handling System (IHS), comprising:

a processing system; and a memory system that is coupled to the processing system and that includes instructions that, when executed by the processing system, cause the processing system to provide a Hyper-Converged Infrastructure (HCI) networking configuration engine that is configured to:

identify each of a plurality of HCI node subsystems that are each coupled to at least one respective port that is connected to the processing system;

determine, based at least in part on the identification of each of the plurality of HCI node subsystems, respective configuration requirements for each of the plurality of HCI node subsystems, wherein respective first configuration requirements for at least one first HCI node subsystem are different than respective second configuration requirements for at least one second HCI node subsystem;

generate, based on the respective configuration requirements for each of the plurality of HCI node subsystems, an HCI networking subsystem configuration that includes first port configuration information for each of the at least one respective port coupled to the at least one first HCI node subsystem, and second port configuration information for each of the at least one respective port coupled to the at least one second HCI node subsystem, wherein the first port configuration information is different than the second port configuration information; and apply the HCI networking subsystem configuration such that the first port configuration information is applied to each of the at least one respective port that is coupled to the at least one first HCI node subsystem, and the second port configuration information is applied to each of the at least one respective port that is coupled to the at least one second HCI node subsystem, and such that each respective port that is coupled to the plurality of HCI node subsystems is configured to provide communication between the processing system and that HCI node subsystem.

8. The IHS of claim 7, wherein the determining the respective configuration requirements for each of the plurality of HCI node subsystems includes:

retrieving, based on the identification of each of the plurality of HCI node subsystems, a respective configuration template for each of the plurality of HCI node subsystems;

receiving, from a user, respective configuration information in each respective configuration template; and determining, using the respective configuration information and respective configuration templates, the respective configuration requirements for each of the plurality of HCI node subsystems.

9. The IHS of claim 8, wherein the retrieving the respective configuration template for each of the plurality of HCI node subsystems includes at least one of:

retrieving the respective configuration template for at least one of the plurality of HCI node subsystems from a storage system that is locally accessible by the processing system; and retrieving the respective configuration template for at least one of the plurality of HCI node subsystems via a network.

10. The IHS of claim 7, wherein the identification of each of the plurality of HCI node subsystems includes:

retrieving a respective identification of each of the plurality of HCI node subsystems via an identity module included in that HCI node subsystem.

11. The IHS of claim 7, wherein the determining the respective configuration requirements for each of the plurality of HCI node subsystems includes:

retrieving HCI node subsystem host configuration information from each of the plurality of HCI node subsystems;

identifying, in the HCI node subsystem host configuration information for each of the plurality of HCI node subsystems, respective logical HCI node subsystem host networking configuration sub-information and physical HCI node subsystem host networking configuration sub-information for each of the plurality of HCI node subsystems; and generating, using the respective logical HCI node subsystem host networking configuration sub-information and physical HCI node subsystem host networking configuration sub-information identified for each of the plurality of HCI node subsystems, a per-port configuration information for each at least one respective port connected to that HCI node subsystem.

12. The IHS of claim 11, wherein the generating the HCI networking subsystem configuration includes:

combining the per-port configuration information generated for the plurality of HCI node subsystems to generate the HCI networking subsystem configuration.

13. The IHS of claim 11, wherein the HCI networking configuration engine is configured to:

verify per-port configuration information generated for at least one of the plurality of HCI node subsystems with at least one HCI networking subsystem that is also coupled to that at least one of the plurality of HCI node subsystems.

14. A method for configuring Hyper-Converged Infrastructure (HCI) networking, comprising:

identifying, by a networking subsystem, each of a plurality of Hyper-Converged Infrastructure (HCI) node subsystems that are each coupled to at least one respective port that is connected to the networking subsystem;

determining, by the networking subsystem based at least in part on the identification of each of the plurality of HCI node subsystems, respective configuration requirements for each of the plurality of HCI node subsystems, wherein respective first configuration requirements for at least one first HCI node subsystem are different than respective second configuration requirements for at least one second HCI node subsystem;

generating, by the networking subsystem based on the respective configuration requirements for each of the plurality of HCI node subsystems, a networking subsystem configuration that includes first port configuration information for each of the at least one respective port coupled to the at least one first HCI node subsystem, and second port configuration information for each of the at least one respective port coupled to the at least one second HCI node subsystem, wherein the first port configuration information is different than the second port configuration information; and applying, by the networking subsystem, the networking subsystem configuration such that the first port configuration information is applied to each of the at least one respective port that is coupled to the at least one first HCI node subsystem, and the second port configuration information is applied to each of the at least one respective port that is coupled to the at least one second HCI node subsystem, and such that each respective port that is coupled to the plurality of HCI node subsystems is configured to provide communication between the networking subsystem and that HCI node subsystem.

15. The method of claim 14, wherein the determining the respective configuration requirements for each of the plurality of HCI node subsystems includes:

retrieving, by the networking subsystem based on the identification of each of the plurality of HCI node subsystems, a respective configuration template for each of the plurality of HCI node subsystems;

receiving, by the networking subsystem from a user, respective configuration information in each respective configuration template; and determining, by the networking subsystem using the respective configuration information and respective configuration templates, the respective configuration requirements for each of the plurality of HCI node subsystems.

16. The method of claim 15, wherein the retrieving the respective configuration template for each of the plurality of HCI node subsystems includes at least one of:

retrieving, by the networking subsystem, the respective configuration template for at least one of the plurality of HCI node subsystems from a storage system that is included in the networking subsystem; and retrieving, by the networking subsystem, the respective configuration template for at least one of the plurality of HCI node subsystems via a network.

17. The method of claim 14, wherein the identification of each of the plurality of HCI node subsystems includes:

retrieving, by the networking subsystem, a respective identification of each of the plurality of HCI node subsystems via an identity module included in that HCI node subsystem.

18. The method of claim 14, wherein the determining the respective configuration requirements for each of the plurality of HCI node subsystems includes:

retrieving, by the networking subsystem, HCI node subsystem host configuration information from each of the plurality of HCI node subsystems;

identifying, by the networking subsystem in the HCI node subsystem host configuration information for each of the plurality of HCI node subsystems, respective logical HCI node subsystem host networking configuration sub-information and physical HCI node subsystem host networking configuration sub-information for each of the plurality of HCI node subsystems; and generating, by the networking subsystem using the respective logical HCI node subsystem host networking configuration sub-information and physical HCI node subsystem host networking configuration sub-information identified for each of the plurality of HCI node subsystems, a per-port configuration information for each at least one respective port connected to that HCI node subsystem.

19. The method of claim 18, wherein the generating the networking subsystem configuration includes:

combining, by the networking subsystem, the per-port configuration information generated for the plurality of HCI node subsystems to generate the networking subsystem configuration.

20. The method of claim 14, further comprising:

verifying, by the networking subsystem, per-port configuration information generated for at least one of the plurality of HCI node subsystems with at least one other networking subsystem that is also coupled to that at least one of the plurality of HCI node subsystems.

* * * * *